Patented Dec. 18, 1945

2,391,095

UNITED STATES PATENT OFFICE 2,391,095

VULCANIZED HIGH-PRESSURE POLYMERS

Henry B. Kellog, Union City, and Per K. Frolich, Westfield, N. J., assignors to Standard Oil Development Company, a corporation of Delaware No Drawing. Application November 8, 1941, Serial No. 418,316

17 Claims. (Cl. 260—79)

This invention relates to the treatment with sulfur of the unsaturated interpolymerization products of high molecular weight which are prepared at high pressures from mixtures of mono-olefins and other polymerizable organic compounds of relatively greater olefinic unsaturation. It has especial application to the treatment with sulfur of high molecular weight interpolymerization products of ethylene with other polymerizable organic compounds having polyolefinic unsaturation which are obtained by the treatment of a mixture of ethylene and such polyolefinic compounds at high pressures, generally above about 500 atmospheres.

One object of this invention is to provide novel sulfur-containing interpolymeric materials with physical properties similar to rubber and which are suitable for use as rubber substitutes in numerous applications. Other and further objects will be apparent from the following description and the claims.

It is known that semi-solid and solid waxlike polymers of ethylene having high molecular weights of at least 2,000 are obtained by subjecting ethylene to very high pressures of the order of 500 to 1500 atmospheres, preferably in the presence of traces of oxygen, at temperatures below about 400° C. and preferably between about 100° C. and 250° C., with careful control of the reaction temperature and with provisions for removing the large amounts of heat liberated in the reaction in order to avoid exceeding the desired temperature in the reaction zone. Such polymers are substantially saturated in character and react only very slightly, if at all, with sulfur. Similar interpolymers or copolymerization products of a high degree of saturation are obtained by the treatment of mixtures of ethylene with other unsaturated hydrocarbons having a single olefinic linkage.

According to the present invention, a mixture of a suitable mono-olefin, such as ethylene with a polyolefine (containing at least two double bonds of the olefinic type per molecule) is subjected to similar high pressure polymerization treatment with the production of high molecular weight semisolid or solid interpolymerization products or "copolymers." These products have a substantially higher degree of unsaturation of such a nature that they can be caused to react with sulfur to form desirable rubber-like materials.

The mixture to be subjected to the high pressure polymerization treatment should contain at least 75% (molal basis) of ethylene and about 1% to 25%, preferably about 2% to 5% or 10%, of polyolefinic materials.

In place of ethylene, other mono-olefins preferably of low molecular weight may be used, such as propylene, the n-butylenes, isobutylene, 3-methyl butene-1, and other normally gaseous or light liquid olefines. Mixtures of these with each other, and with ethylene may also be used.

Suitable polyolefinic compounds include the di-olefins, such as butadiene, piperylene, isoprene, chloroprene, dimethyl butadiene, 2,3 dichlorbutadiene, and their homologs, 2-methyl-1,3 butadiene, 1,3-hexadiene, 3-methyl-2,4-pentadiene, 2-normal butyl-1,3 butadiene (butoprene), 2-tertiary butyl-1,3-butadiene, 2-normal heptyl butadiene (heptoprene) and their homologs. Suitable acetylenic substances such as acetylene, phenyl acetylene, vinyl acetylene, divinyl acetylene may also be used. Divinyl benzene and other divinyl compounds are also suitable. Cyclic polymerizable diolefines such as cyclopentadiene, and the like, the diolefins of four to six carbon atoms are preferred, although other diolefins and organic compounds containing two, three or even more olefinic linkages in the molecule may also be used. Mixtures of two or more of such diolefins and polyolefinic materials may also be used to prepare mixed interpolymerizates with the ethylene. The remainder of the mixture may consist of other olefins of preferably three to six carbon atoms which may also interpolymerize with the ethylene, and/or relatively inert materials, such as the normally gaseous paraffins, nitrogen and like inert gases. The presence of a small amount of oxygen, above about 0.01%, and preferably between about 0.03% and 0.1%, is also desirable as this greatly reduces the pressure at which the reaction may be conducted. Somewhat larger amounts of oxygen may be used but care should be taken to avoid the presence of sufficient oxygen to create an explosive mixture.

The interpolymerization of such mixtures is accomplished by subjecting them to high pressures of the order of 1,000 to 1,500 atmospheres or higher and the highest attainable pressures of 15,000 atmospheres or more may be used. The interpolymerization may also be conducted at lower pressures of the order of 500 atmospheres or less when free oxygen is present in the amounts indicated above or when reactive materials capable of supplying oxygen in similar amounts, such as the inorganic and organic peroxides, e. g., benzyl peroxide, are used. Even lower pressures of the order of 100 atmospheres may be used with the active, readily polymerizable conjugated diolefins in about 10% to 25% concentration. The mixture of reagents is held at the reaction pressure for a time sufficient to cause the reaction to proceed to the desired extent, which varies from a few minutes to a considerable number of hours, depending upon the amount of oxygen or other catalyst used, and the reaction temperature, which ranges from about room temperature to about 300 or 400° C.; reaction temperatures between about 100 and 200° C. being generally preferred. There are thus obtained copolymers or interpolymerization products having molecular weights above about 2,000 and generally of about 10,000 to 30,000 or more. The higher molecular weight products may be obtained by subjecting the polymerization products to distillation under high vacuum or by extraction with suitable solvents to remove materials of relatively lower molecular weight.

The degree of unsaturation of these interpolymerization products is dependent upon the amount of diolefin or other polyolefin entering into the reaction and may be closely controlled by adjustment of the proportions of the initial reagents.

These interpolymerization products may be cured according to the present invention so as to completely saturate the substance chemically without converting it into a hard resin, as occurs when rubber is thoroughly saturated with sulfur. That is, sulfur may be applied to the interpolymer in a proportion sufficient to saturate the interpolymer completely while retaining desired characteristics of elasticity, high tensile strength, elongation and elastic limit, but if the same proportion of sulfur is applied to rubber, the rubber remains highly unsaturated. Furthermore, these interpolymerized materials combine with sulfur alone only with great difficulty and at elevated temperatures, in further sharp distinction from rubber. Furthermore, the response of the material to sulfur-containing compounds to aid the curing or sulfurization reaction is greatly different from that of rubber, the best cures being obtained when very active accelerators are used such as the carbamate and thiuram types.

The requirements of the interpolymerized materials for the obtaining of a satisfactory cure with sulfur to yield a maximum tensile strength and a maximum elasticity appear to be determined by the molecular weight in combination with the amount of unsaturation. The optimum amount of unsaturation appears to be that indicated by an iodine number of the material of 2 to about 8 and generally less than about 50, although even more unsaturated interpolymers may be prepared and cured according to the present invention to produce useful rubberlike products. About the minimum useful amount of unsaturation permitting curing of the interpolymers is that corresponding to an iodine number of 1. The molecular weight of the interpolymers should be above a minimum value of about 10,000 to 15,000 in order to produce a material which can be cured to an elastic material with structural properties (freedom from cold flow), this minimum molecular weight being required largely without regard to the amount of unsaturation in the molecule, although it varies to some extent with the amount of unsaturation, the materials of relatively high unsaturation, when cured with correspondingly large amounts of sulfur, equivalent to such unsaturation, being useful in relatively lower molecular weights than the more saturated interpolymers. Polymeric materials of low enough molecular weight to have the consistency of oils or greases showing marked cold flow, may react with sulfur but do not give tough, elastic products. (The iodine number or iodine value is the amount of halogen expressed as centigrams of iodine required to saturate chemically one gram of the substance in question.)

These relatively unsaturated interpolymers, consisting substantially of ethylene or other mono-olefin but modified with small amounts of polyolefins, have a distinct advantage over the simple polymers of ethylene and the interpolymers of ethylene with mono-olefins in that these latter cannot be cured or vulcanized in the ordinary sense of the term, whereas the ethylene-polyolefin interpolymers can be cured so as to have desirable characteristics of hardness, toughness, elasticity, etc. On the other hand, rubber-like polymers prepared largely or substantially from diolefins alone are much more susceptible to oxidation and attack by acids, ozone and other chemicals, even after curing. Moreover, such diolefin polymers have a low tensile strength in the cured pure gum form, whereas the cured products of the present invention have substantially higher tensile strength.

In the curing of the ethylene-polyolefin polymeric material according to the present invention, it is possible to compound the polymeric material with sulfur, and by prolonged heating at a substantially elevated temperature, a cure can be obtained. Usually, however, this cure is not complete and is suitable for only a limited number of purposes. With sulfur alone the rate of reaction between the sulfur and the copolymer is very slow and at the temperature required for this reaction, de-polymerization and breakdown of the polymeric material occurs at such a speed that considerable injury is caused before a maximum cure is obtained. Because of this, it is highly desirable to incorporate into the polymeric material a suitable quantity of suitable cure aids and accelerators, including such substances as zinc oxide, stearic acid, the various sulfur compounds of thiuram and the alkyl dithiocarbamates, together with an appropriate amount of sulfur. An example of a suitable compounding formula is as follows:

| | Parts by weight |
|---|---|
| Synthetic copolymer (about 10,000 molecular weight, iodine number 5, prepared by high pressure interpolymerization of ethylene and butadiene) | 100 |
| Zinc oxide | 5 |
| Stearic acid | 3 |
| Sulfur | 2 |
| "Tuads" (tetramethyl-thiuram disulfide) | 1 |

The compounding ingredients, including the sulfur, stearic acid and zinc oxide, are preferably thoroughly mixed with the synthetic copolymer while working it in a mill such as one of the Banbury type, or on an open roll mill, where the mixture is worked until thoroughly uniform incorporation of the various ingredients is obtained. The "Tuads" is desirably added at practically the close of the mixing operation, preferably after the rolls and the mix have been cooled to a considerable extent to remove heat generated in the first mixing operation, since otherwise a premature cure may occur on the rolls.

This compounded polymer produces what may be called a pure gum stock since it contains only a small amount of added material. Alternatively, a wide range of auxiliary substances, such as inert pigments, organic fillers, clay, carbon black, plasticizers and other substances may be added to modify the characteristics of the material. A typical black stock formula is as above, but with the addition of 50 parts of carbon black.

The compounded interpolymer is then cured, preferably in molds, by the application of a temperature ranging from about 125 to 175° C. or higher, up to 225° C., for a time interval ranging from about five minutes to 120 minutes or more, according to the curing temperature, the character of the sulfur compound, the extent of cure desired, etc.

For some purposes, the curing is preferably carried out at a relatively low temperature, e. g., between about 100° C. and 150° C., preferably about 120° C. to 130° C., or at a temperature at which a relatively long time, e. g., four or five hours or more, is required to effect the curing. In other words, for some purposes, it is better to use a low temperature, long time curing treatment than to use a high temperature, short time curing treatment.

The curing time and curing temperature are markedly effected by the amount and nature of the sulfur aid or accelerator. Very active accelerators of the type of "Tuads" and the alkyl dithiocarbamates are thus preferred, although curing under relatively more intensive conditions of temperature and time than required with these accelerators may also be obtained with other accelerators. Examples of suitable accelerators are Tetramethyl thiuram disulfide
Selenium tetraethyl dithiocarbamate
Zinc dibutyl dithiocarbamate In regard to the dithiocarbamate accelerators, the dialkyl dithiocarbamates are preferred.

The addition of plasticizers and softeners to the ethylene-polybutene interpolymers is often desirable in order to facilitate mixing and subsequent processing, as such interpolymers, especially those of high molecular weight ranges, are rather tough. Suitable softeners and plasticizers are coal tar, aromatic naphthas, waxes, both paraffin wax, mineral and vegetable waxes, tricresyl phosphate, dibutyl phthalate, and the like. In compounding these copolymers, it is generally desirable to add such softeners and plasticizers among the first compounding agents added to the copolymers in order to aid the incorporation and distribution of the other ingredients in the copolymer composition.

An example of a suitable formula including such softeners and plasticizers is as follows:

| | Parts by weight |
|---|---|
| Synthetic copolymer (about 10,000 molecular weight, iodine number 5, prepared by high pressure polymerization of ethylene and butadiene) | 100 |
| Wood rosin | 4 |
| Coal tar | 4 |
| Sulfur | 1.5 |
| Stearic acid | 1.5 |
| Ozokerite wax | 2 |
| Zinc oxide | 5 |
| Carbon black | 45 |
| "Tuads" | .50 |

The compounded interpolymer is then cured at 155° C. for thirty minutes.

The cured copolymeric materials of the present invention are markedly superior in chemical resistance to rubber and to the rubber substitutes prepared primarily from diolefins, such as isoprene, butadiene, etc., and are surprisingly inert to chemical reagents and solvents generally, such as benzene, ethylene dichloride, mineral acids, such as sulfuric acid and nitric acid, oxygen (even in the presence of small amounts of copper, manganese, cobalt and their salts). The resistance of these cured copolymers to the effects of sunlight and to aging in the presence or absence of sunlight is also very marked.

The above presented formula contains various auxiliary substances which are desirable in small proportions. These particularly are small proportions of stearic acid and zinc oxide. These substances substantially improve the physical characteristics of the cured copolymers but their method of operation is still unknown. Carbon black is also a desirable constituent of the cured copolymeric material. It very materially raises the abrasion resistance of this material and is relatively harmless to its other physical properties. The cured polymeric materials of this invention may be loaded with a wide variety of pigments. For instance, fine particle size whiting and fine particle titanium dioxide may be used as fillers in such large percentages as 100% and even over 200% of the weight of the copolymeric substance. Clay of the type known as "Dixie clay" may be used to advantage in proportions up to about 50% on the polymeric substance. Zinc oxide likewise may be used as a loading pigment as well as an aid to the curing and the results are much the same as with titanium dioxide. The asphaltic substance known as "mineral rubber" is likewise an excellent loading material.

Particularly valuable compositions of the above described interpolymers are obtained in admixture with a wide range of other substances. These other substances particularly are the various isobutylene polymers, both the simple viscous liquid and plastic solid polymers of isobutylene known as "Vistanex Polybutene" and also in admixture with the interpolymers of isoolefins and diolefins produced at low temperature. Both of these polymers can be admixed with the polymers of the present invention and the mixture be cured with sulfur. With respect to the isoolefindiolefin low temperature interpolymers and the polymers obtained according to the present invention, the two curing reactions are sufficiently nearly alike to permit of the preparation of mixtures of the two interpolymers together with sulfur, sulfurization aids and various fillers if desired, followed by the simultaneous curing of the two substances in admixture to produce particularly valuable elastic bodies, which are materially harder and of materially different elastic characteristics than are obtainable with other types of plastic and elastic substances. Similarly, the interpolymers of the present invention are particularly advantageous in admixture with the simple polymers of ethylene (Polythene) and with the interpolymers of ethylene and mono-olefines such as isobutylene. This composition of matter is particularly valuable for electrical insulation because of its very low dielectric losses, its high dielectric strength, and its advantageous dielectric constant. Similarly the interpolymers of the present invention admix readily with paraffin wax, and high pressure ethylene polymers, to produce compositions of matter having substantial strength and particularly valuable electrical properties. The materials also mix readily with rubber, and may be compounded therewith together with appropriate amounts of sulfur and sulfurization aids, and the rubber vulcanized and the polymers cured simultaneously by appropriate heat treatment. Similarly the materials mix readily with the various polybutadiene types of synthetic rubber, and with the similar interpolymers of butadiene and acrylonitrile or interpolymers of butadiene and styrene both of which are prepared by the emulsion polymerization technique in which use also it imparts marked improvements in electrical characteristics and physical characteristics to the compound, especially in the presence of sulfur, a sulfurization aid and various amounts of solid pigment fillers.

The cured copolymeric materials of this invention are of great value for electrical cable coatings, impregnated or surface coated or laminated fabric such as cloth, leather, felt, paper veneer, etc., and floor coverings, acid-resistant linings, gasket materials, mechanical goods, belting and sheeting, automobile tires, inner tubes, valves and accessories, such as motor supports, windshield stripping or vibration dampeners. Furthermore, the cured copolymeric materials may be produced in a sponge-like form and employed for thermal insulation or shock-absorbing material. The cured copolymeric material of this invention is also of use when mixed either alone or in emulsion form with asphalt, waxes, cements, Portland cement, etc., to waterproof and windproof masonry composition boards and other permeable structures. It is also suitable for use in submarine cables, pump gaskets, wringer rolls, fire hose, steam gaskets, and as a coating or impregnating agent for Cellophane, paper, pyroxylin etc., in bottle and jar cap enclosures. It may be used with cork fillers for shoe soles and compounded with asphalt as a laminating agent for fabrics generally, whether woven, felted or laid like paper. It may also be used for storage battery cases, storage battery separators and acid resistant goods generally. It is also useful in tree surgery for sealing wounds. It may also be used as rug backing, for the preparation of rug underpads and in sponge form in spring cushions, mattresses and seat springs, etc.

It is to be understood that there are presented herein but a limited number of embodiments of the structure of this material, that these are intended solely as illustrative examples and that the invention is not limited thereto, but that it is desired to claim this invention as broadly as the prior art permits.

I claim:

1. The process of preparing cured interpolymers of ethylene comprising subjecting a mixture containing at least 75 mol per cent of ethylene and about 1 to 25 mol per cent of a poly-olefin to interpolymerization conditions at a pressure of more than 500 atmospheres to produce an interpolymer having substantial unsaturation and physical characteristics ranging from those of a viscous liquid to a plastic solid, and thereafter heating said interpolymer with a sulfur.

2. Process of preparing cured linear aliphatic hydrocarbon interpolymers comprising the step of subjecting to interpolymerization conditions a mixture containing at least 75 mol per cent of ethylene and less than 25 mol per cent of an aliphatic conjugated diolefin at a reaction temperature and a pressure of more than 500 atmospheres for a time sufficient to secure a viscous liquid to plastic solid interpolymerization product and thereafter heating said interpolymerization product with sulfur and a sulfurization aid.

3. Process according to claim 2 in which the curing operation is conducted by heating the said interpolymerization product with sulfur and a sulfurization aid at a temperature ranging from 100° C. to 225° C.

4. Process according to claim 2 in which the curing operation is conducted by heating the said interpolymerization product with sulfur and a sulfurization aid at a temperature ranging from 100° C. to 225° C. for a time ranging from 2 to 240 minutes.

5. Process according to claim 2 in which the curing operation is conducted by heating the said interpolymerization product with sulfur and a sulfurization aid at a temperature ranging from 100° C. to 225° C. for a time ranging from 2 to 240 minutes under pressure.

6. Process according to claim 2 in which said diolefin has from 4 to 6 carbon atoms per molecule.

7. Process according to claim 2 in which said diolefin is butadiene.

8. Process according to claim 2 in which said diolefin is isoprene.

9. Process according to claim 2 in which said diolefin is piperylene.

10. Process according to claim 2 in which said sulfurization aid is a sulfide of thiuram.

11. Process according to claim 2 in which said sulfurization aid is tetramethyl thiuram disulfide.

12. Process according to claim 2 in which said sulfurization aid is a thiocarbamate.

13. Process according to claim 2 in which said sulfurization aid is a dialkyl dithiocarbamate.

14. The process of preparing cured interpolymers of ethylene comprising subjecting a mixture containing at least 75 mol per cent of ethylene and about 1 to 25 mol per cent of a poly-olefin to interpolymerization conditions at a pressure of at least 100 atmospheres to produce an interpolymer having substantial unsaturation and physical characteristics ranging from those of a viscous liquid to a plastic solid, and thereafter heating said interpolymer with sulfur.

15. Process according to claim 14 in which said pressure is 1500 atmospheres.

16. A rubber-like plastic product comprising essentially the reaction product of sulfur and a solid unsaturated polymerized hydrocarbon which is obtained by the copolymerization of a mixture containing at least 75 mol per cent of ethylene and about 25 mol per cent of an aliphatic conjugated diolefin at temperatures between room temperatures and 400° C. and under a pressure of more than 500 atmospheres.

17. A rubber-like plastic product comprising essentially the reaction product of sulfur and a solid unsaturated polymerized hydrocarbon which is obtained by the copolymerization of a mixture containing at least 75 mol per cent of ethylene and about 25 mol per cent of butadiene at temperatures between room temperature and 400° C. and under a pressure of more than 500 atmospheres.

HENRY B. KELLOG.
PER K. FROLICH.